Dec. 29, 1925.
W. R. DOUGLAS
1,567,493
COLLAPSIBLE AUTO AND PORCH BED
Filed March 14, 1923
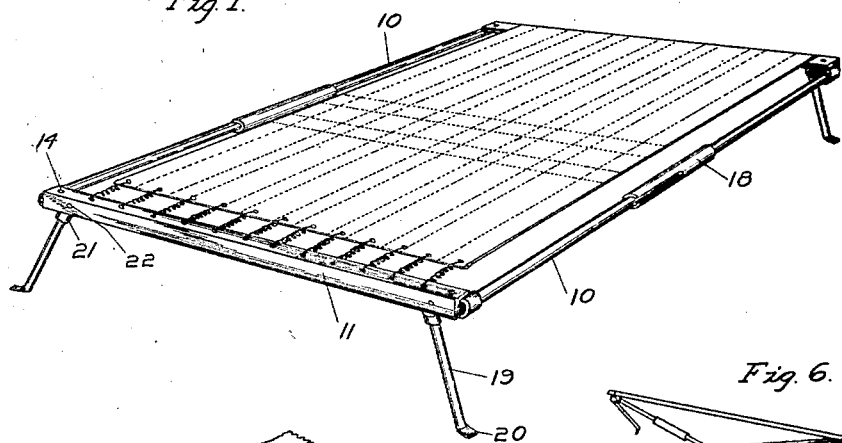
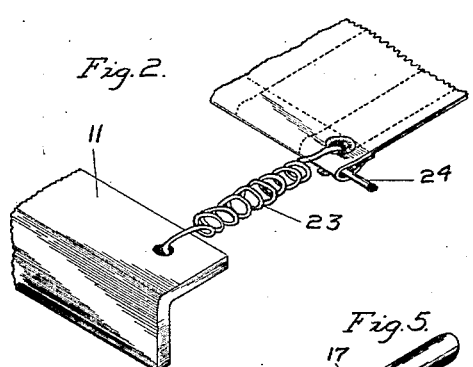
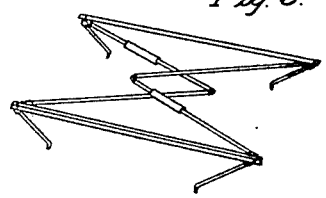
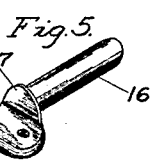
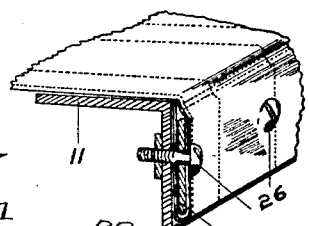
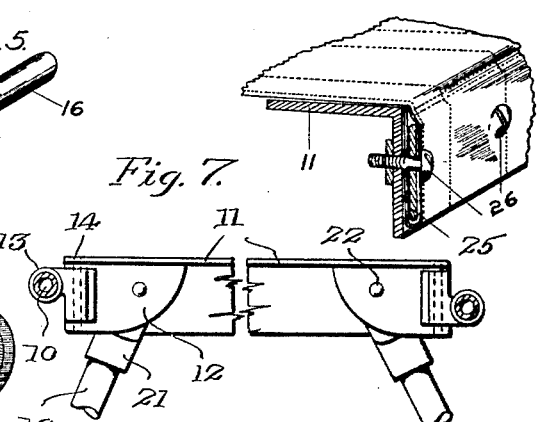
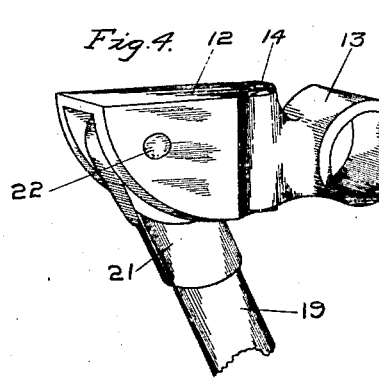
W. R. DOUGLAS. INVENTOR.
BY Emil F. Lange ATTORNEYS.

Patented Dec. 29, 1925.

1,567,493

UNITED STATES PATENT OFFICE.

WALLACE ROBB DOUGLAS, OF CRETE, NEBRASKA, ASSIGNOR OF ONE-HALF TO WILLIAM H. DOUGLAS, OF CRETE, NEBRASKA.

COLLAPSIBLE AUTO AND PORCH BED.

Application filed March 14, 1923. Serial No. 625,121.

*To all whom it may concern:*

Be it known that I, WALLACE ROBB DOUGLAS, a citizen of the United States, residing at Crete, in the county of Saline and State of Nebraska, have invented certain new and useful Improvements in Collapsible Auto and Porch Beds, of which the following is a specification.

My invention relates to collapsible beds, and especially to those collapsible beds which are subjected to much rough usage and hard wear as on camping trips.

The requirements of such a bed are very exacting. In the first place the bed must be light in weight and it must be foldable into the smallest possible space. The carrying capacity of an automobile is limited, both with regard to weight and to space, and since perhaps the greatest use of collapsible beds is in connection with automobile trips, it is of prime importance that the bed be designed to be carried with the other camping equipment in the automobile. The bed must however be frequently set up and taken down, which makes it almost essential that the folding features be of extreme simplicity, so that the operation can be accomplished very quickly, and that the bed be made without detachable parts which are liable to become lost. At the same time the bed must be strong and durable to withstand the rough use in all kinds of weather. The object of my invention is the provision of a bed which meets these and other requirements.

Referring now to the drawings which are part of my application, and in which like numerals refer to like parts in the description, Figure 1 is a perspective view of my bed as seen when set up.

Figure 2 is a fragmentary view of one end of the canvas top of my bed, showing the manner in which that end of the canvas is secured to the end rail.

Figure 3 is a similar fragmentary view of the canvas and end rail at the end opposite that shown in Figure 2.

Figure 4 is a detail view showing the hinge actions at the corner of the bed.

Figure 5 is a detail view of the casting constituting one member of the hinge connecting the two members of each side rail.

Figure 6 is a diagrammatic view of the bed in partly folded position.

Figure 7 is a view of one of the end rails as viewed from the inner side and with the middle portion broken away, and showing particularly the offset relation of the side rails.

The bed frame in its set-up position is rectangular, and comprises tubular side rails 10 and angle iron end rails 11. The side rails 10 each of two lengths of pipe are connected with each other by vertical pivots and connected at their extremities with the ends of the angle iron end rails, these latter connections being also vertical pivots. The angle iron end rails are each positioned with one wall above and the other wall on the outer end of the bed frame. The casting 12 is secured to the end rail at each extremity, in the angle of the angle iron, and is provided with an upper ear and a lower ear both projecting outwardly therefrom. At its inner extremity the casting 12 has vertically disposed ears which are connected at their upper edges by a web. To each casting 12 at its outer extremity is pivotally secured a casting 13 at 14, the pivot 14 being vertical and passing through the upper and lower ears of the casting 12. The end of one of the tubular members of the side rail is forced into the horizontal aperture in the casting 13 and is there securely held by means of a pin or rivet passing through the walls of the casting and through the tubular member, with the outer extremity of the tubular member flush with the outer edge of the aperture in the casting 13.

It should be here noted that the castings 13 are standardized for use on any corner of the bed, but the positions of the castings are reversed on the opposite sides of the bed so as to position the side rail at one side of the bed at a different level than that of the side rail on the other side of the bed. This construction is necessary to avoid interference between the side rails in folding the bed.

The abutting ends of the two members of each side rail are connected by means of the hinge one member of which is shown in Figure 5. Each hinge member consists of a flat, horizontal bearing portion 15 connected to a rod like portion 16, there being a flange 17 at the junction between the two portions, the flange having a width equal to the thickness of the walls of the tubular end rail.

The portion 16 is forced into the inner end of each member of the tubular end rail 10 with the flat portion 15 in horizontal position, and is held against displacement by means of a pin which is driven through both walls of the tubular member and through the portion 16 of the hinge casting. The ears of the hinges project outwardly and the hinges break inwardly as shown in Figure 6. In order to hold the members of each side rail in alignment when the bed is set up, I provide a sliding collar 18, this collar having a slot for the reception of the projecting ears.

The leg 19 is tubular with a flattened, horizontally extending foot 20. The upper end of the leg is driven into the casting 21 and is there anchored by means of a pin or rivet in the manner already described for the other connections of my bed. The casting 21 is pivotally secured to the casting 12 by means of the horizontal pivot 22. The pivot pins 14 and 22 both project through walls of the angle iron end rails and assist in holding the parts rigidly connected. The end rail at the corner extends over the casting 13 to about the middle point of the horizontal tubular portion of that casting when the bed is set up.

From my drawings and description it will be readily apparent that my bed frame will fold into very compact form, with the side rails folded into the space enclosed on three sides by the walls of the angle iron end rails. To fold the frame, the user stands at either the head or the foot of the bed and first slides the collars 18 into unlocking position, after which he grasps the canvas with his two hands at the middle points of the lateral edges and lifts upwardly and toward himself. This causes the joints in the side rails to break inwardly, drawing the opposite end rail toward the user. The halves of the side rails fold together about their common pivot and at the same time they fold against the end rails, or rather into the angles of the angle iron end rails, this latter mentioned movement being about the pivots 14. By slightly lifting the bed, the user can push the four legs about the pivots 22 and also into the angle of the angle iron end rails.

While I do not desire to restrict myself to the use of any specific material, I prefer the use of malleable iron for the castings 12, 13, and 21 and for the hinge casting shown in Figure 5. I have found that this material is admirably suited for this purpose since it is light in weight and strong enough to withstand the bending and torsional strains to which a camp bed is subjected. It also possesses sufficient hardness to withstand to a remarkable degree the wearing action on the hinge joints. The leg casting 21 has a very rigid abutment in the casting 12, so that when the bed is set up, the legs are held in absolutely rigid position. The entire frame is so strong and rigid that it will support the weight of two heavy men on the middle or joint portions of the side rails.

It is my intention to make the bed with either a canvas or a spring cover, but since the canvas cover or top will probably be used more extensively on camping trips than the spring top, I have shown only the canvas top in my drawings. The canvas has stitched thereto on its under side a number of strips of webbing longitudinally placed, and also a smaller number (preferably two) strips of webbing transversely placed where the hips of the occupants of the bed would normally rest. All of the strips of webbing are preferably made of relatively inelastic material and tend to prevent sagging of the canvas at the points of greatest strain. Figures 2 and 3 illustrate the means for securing the canvas top to the bed frame. The end rail 11, a fragment of which is shown in Figure 2, is provided with apertures in its upper or horizontal wall, and secured through these apertures are helical springs 23. The adjacent end of the canvas is looped and a reinforcing rod 24 is placed in the loop. The inner ends of the helical springs 23 are secured to the canvas back of the rod 24, the rod thus distributing the tension on the canvas. The opposite end rail 11 has apertures in its vertical wall. These apertures need not be numerous, and my preference is that they number not more than five. The end of the canvas is also looped, and into the looped portion is placed a rod 25 having apertures which correspond in number and position with the apertures in the end rail. The apertures of the bar and end rail are simply brought into registration, after which the parts are secured together by means of bolts 26 passing through the aligning apertures of the rod and end rail. This construction is important since it affords a quick and easy way of restoring the tension in the canvas. If the tension becomes too weak, it is only necessary to remove the few bolts 26 to give the bar 25 a half turn, and then to replace the bolts. I have found this to be much easier and less liable to cause trouble than when the adjustment is made in the frame of the bed as has heretofore been done.

From the foregoing description it will be seen that I have provided a bed of extreme simplicity and great strength and durability. To set up or take down the bed requires less than thirty seconds each. The tension adjustment, a rather infrequent operation, can be made in a few minutes, and because of its mechanical construction, it results in no weakening effect on the frame of the bed as often happens when the adjustment is made by lengthening the frame. The folding features are not only simple in operation, but they result in a folded bed which occupies very little space. The transverse webbing at the points of greatest strain add much to the comfort of the sleeper and to the life of the bed.

Having fully described my invention in terms which will be readily understood by others skilled in the art to which it pertains, what I believe to be new and desire to secure by Letters Patent of the United States is:—

1. A corner construction for collapsible beds including a casting which is adapted to be secured to an end rail of the bed at the extremity thereof, and a second casting secured to said first casting by a vertical pivot, said second casting being provided with a horizontal socket for receiving the extremity of a side rail, the socket being offset vertically whereby the reversal of said second casting on the two sides of the bed will position the side rails of the bed at different levels so as to afford clearance between the side rails when collapsing the bed.

2. A bed corner including an angle iron end rail, the walls of said angle iron end rail being directed inwardly and downwardly respectively, a casting secured within the angular portion of said end rail and adjacent the end of the end rail, said casting having upper and lower horizontal ears at its outer extremity for receiving therebetween and in pivotal relation therewith a second casting, said second casting being secured to the extremity of a side rail, the inner extremity of the first said casting having vertically positioned, parallel, and spaced ears, a leg secured by a horizontal pivot to said casting between said last named ears, whereby the leg may be folded into parallel relation with said end rail, said leg having an arcuate movement which is greater than a right angle, and an abutment on said casting for limiting the pivotal movement of said leg.

In testimony whereof I affix my signature.

WALLACE ROBB DOUGLAS.